United States Patent [19]

Hassenzahl et al.

[11] Patent Number: 5,692,919

[45] Date of Patent: Dec. 2, 1997

[54] ROTATABLE CONTACT CARRIER FOR INTERCONNECTING ELECTRICAL DEVICES

[75] Inventors: Steven L. Hassenzahl, Atlanta; Michael B. Kirschner, Alpharetta, both of Ga.

[73] Assignee: Motorola, Inc., Schaumburg, Ill.

[21] Appl. No.: 434,633

[22] Filed: May 4, 1995

[51] Int. Cl.$^6$ ................................. H01R 13/627
[52] U.S. Cl. ........................... 439/341; 439/261
[58] Field of Search ........................ 439/341, 259, 439/260, 261, 500; 429/97–100

[56] References Cited

U.S. PATENT DOCUMENTS

| | | | |
|---|---|---|---|
| 3,617,985 | 11/1971 | Kehl | 439/341 |
| 3,728,664 | 4/1973 | Hurst | 439/341 |
| 3,969,796 | 7/1976 | Hodsdon et al. | 439/341 |
| 4,743,746 | 5/1988 | Murschall et al. | 439/341 |
| 5,007,859 | 4/1991 | Sangregory et al. | 439/500 |
| 5,259,786 | 11/1993 | Huang | 439/500 |
| 5,306,172 | 4/1994 | Inada et al. | 439/299 |
| 5,320,561 | 6/1994 | Cook et al. | 439/500 |
| 5,398,162 | 3/1995 | Bice | 439/341 |

*Primary Examiner*—Hien Vu
*Attorney, Agent, or Firm*—Kenneth Massaroni; Scott M. Garrett; Kelly A. Gardner

[57] ABSTRACT

A contact carrier (10) for a first electrical device comprises a contact body (11) having a top (12), bottom (14), and four sides (16). A protrusion (18) extends from the top (12). First and second pivot protrusions or depressions (22, 23) are located on opposing sides (20, 21) of the contact body (11), and allow the contact body (11) to rotate about the axis (24) of the contact body (11) when the protrusion (18) is engaged by a second electrical device. At least one electrical contact (26) is disposed on a first side (27) of the contact body (11). A flexible circuit board (28) interconnects the electrical contact(s) (26) with the first electrical device and may act to bias the contact body (11) such that the electrical contacts (26) are concealed until protrusion (18) is engaged.

17 Claims, 5 Drawing Sheets

5,692,919

1

ROTATABLE CONTACT CARRIER FOR INTERCONNECTING ELECTRICAL DEVICES

TECHNICAL FIELD

This invention relates in general to electrical devices and more particularly to contact carriers for interconnecting electrical devices.

BACKGROUND OF THE INVENTION

As electronics are increasingly integrated, portable electrical devices are being used in a wider variety of applications. Cellular phones, computers, and pagers are a few example of such devices which have gained widespread use. Many of such devices have contacts or connectors for interconnecting with other electrical devices such as battery packs, wireless modems, and numerous other such peripheral devices. These contacts provide an opportunity for failure by corrosion, and also provide a path by which electro-static discharge (ESD) may enter into the device and destroy or degrade components.

In battery packs the problem can be more severe. To prevent what is commonly referred to as hard shorts, battery packs of reputable manufacture are provided with short circuit protection, such as polyswitches or similar devices. However, there is the possibility that a foreign object may make contact with the battery contacts and draw a current level which would normally be provided to an electrical device. This is commonly referred to as a soft short. As a result, the battery packs short circuit protection is not activated, and the foreign object may potentially heat up. In the worst case this could cause burns to a user, and will at least discharge the battery pack.

To address these issues, attention has been given to the material the electrical contacts are fabricated from so that they resist corrosion. Attention must also be given to preventing damage to a device's electrical system from ESD events. This is typically handled by the placement of zener diodes and capacitors connected to the exposed contacts, and is usually dependent on the electronic design. To help reduce the risk of soft shorts in battery packs, the battery contacts are often recessed so that it would be difficult to make an electrical connection between two contacts with a rigid conductor such as a key. However this does not eliminate the risk of soft shorts. It has been contemplated to provide the user with a removable cover, or a pouch to store the battery in when it is not in use, but this puts the responsibility on the user.

Prior art attempts to minimize or eliminate soft shorts have not been wholly successful. Therefore there exists a need by which the contacts of electrical devices may be protected from corrosive elements, ESD, and particularly soft shorts.

2

Figure 6:
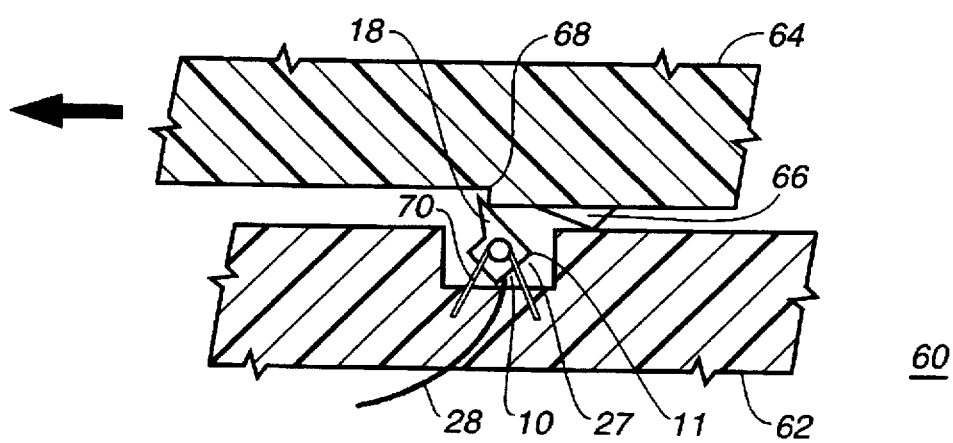
Figure 7:
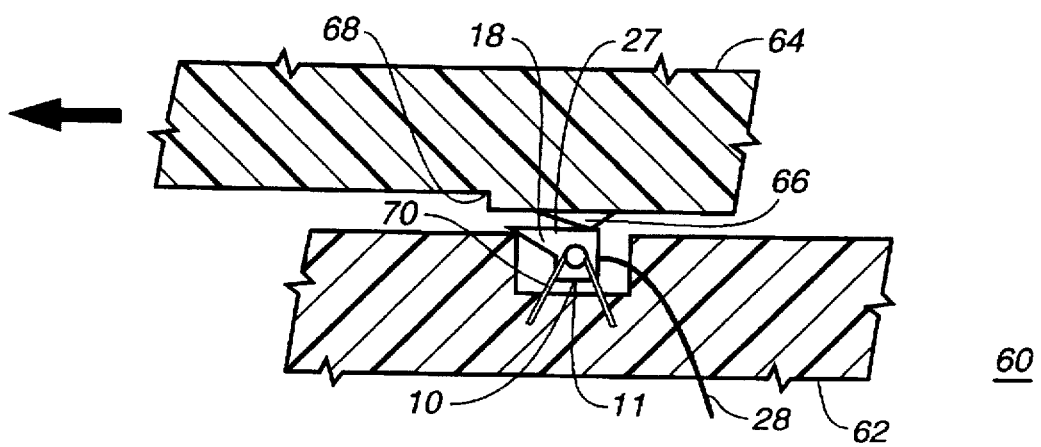

FIG. 6 is a second cross sectional side view of a first and second electrical device engaging a contact carrier in accordance with the invention; and FIG. 7 is a third cross sectional side view of a first and second electrical device engaging a contact carrier in accordance with the invention;

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 1:
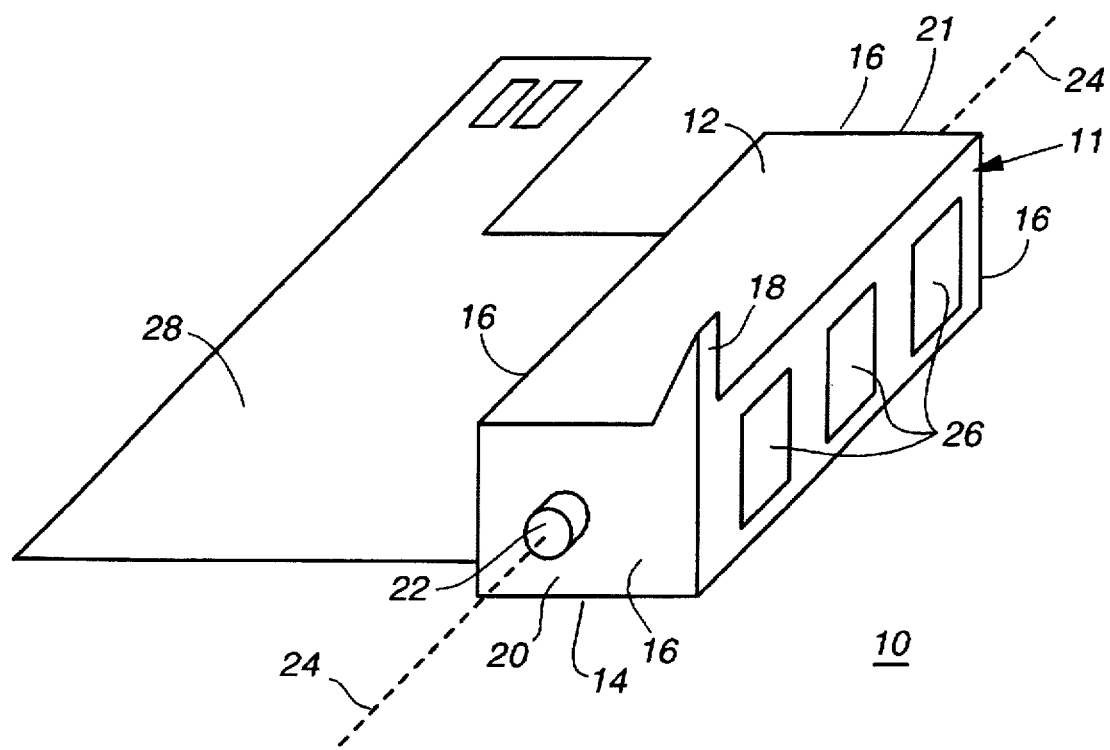
FIG. 1 is a perspective view of a first alternate embodiment of a contact carrier in accordance with the invention.

Referring now to FIG. 1, there is illustrated therein a perspective view of a first alternate embodiment of a contact carrier 10 in accordance with the invention. The contact carrier 10 comprising a carrier body 11 having a top 12, bottom 14, four sides 16, and a protrusion 18 extending from at least a portion of the top 12 of the carrier body 11. Two of the four sides 16 are opposing sides 20 21, having first and second pivot depressions or pivot protrusions 22, 23 along the axis 24 of the contact body 11 composing a pivotal mounting for affixing the carrier body to a device.

The first protrusion 22 extends along the axis 24 from at least a portion of opposing side 20, and the second protrusion 23 extends from at least a portion of the corresponding opposing side 21 along the same axis 24. The first and second pivot depressions or protrusions 22, 23 are engaged by corresponding structure on a first electrical device (not shown) such that the contact carrier 10 is rotatable about the axis 24.

Figure 5:
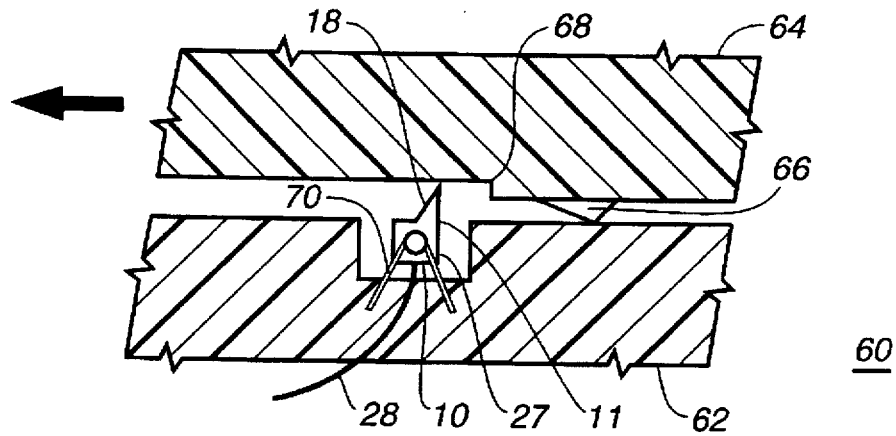
FIG. 5 is a first cross sectional side view of a first and second electrical device engaging a contact carrier in accordance with the invention.

One or more electrical contacts 26 are disposed on a third side 27 of the carrier body 11 for electrically interconnecting the first electrical device with a second electrical device (not shown). The protrusion 18 extending from the top 12 engages with corresponding structure of the second electrical device when it is connected to the first electrical device, thereby rotating the contact carrier 10 around the longitudinal axis Zy, and engaging electrical contacts 26 with corresponding electrical contacts of the second electrical device. This is illustrated in FIGS. 5–7 below. To electrically interconnect the electrical contacts 26 with the first electrical device, a flexible circuit board 28 may be electrically connected between the first electrical device and the contact carrier 10, by teachings known in the art. The flexible circuit board 28 allows movement of the contact carrier 10 while maintaining the electrical connection, and may constitute a spring means for biasing or returning the contact carrier into a position where the electrical contacts 26 are normally concealed. It will be appreciated by those skilled in the art that a wire or wires would function similarly.

Figure 2:
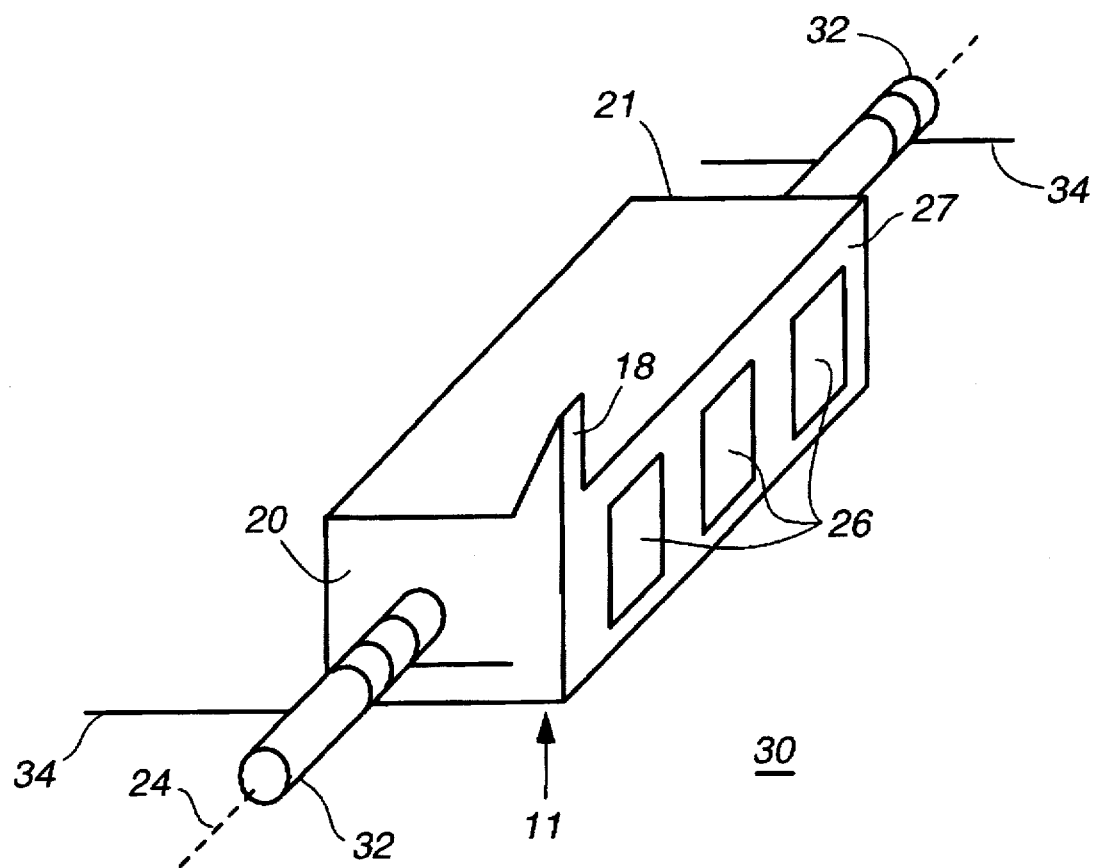
FIG. 2 is a perspective view of a second alternate embodiment of a contact carrier in accordance with the invention.

Referring now to FIG. 2, there is illustrated therein a perspective view of a second alternate embodiment of a contact carrier in accordance with the invention. The contact carrier 30 shown here is identical to the contact carrier 10 shown in FIG. 1, with the exception of the following differences. A rod shaped protrusion 32 extends from at least one of the opposing sides 20, 21 along the axis 24. Mounted on the rod shaped protrusion 32 is a spring 34 for biasing the contact carrier 30 so that the electrical contacts 26 are concealed until the protrusion 18 is engaged. Alternatively, the rod 32 may protrude from both of sides 20, 21, with a spring 34 mounted on both ends.

Figure 3:
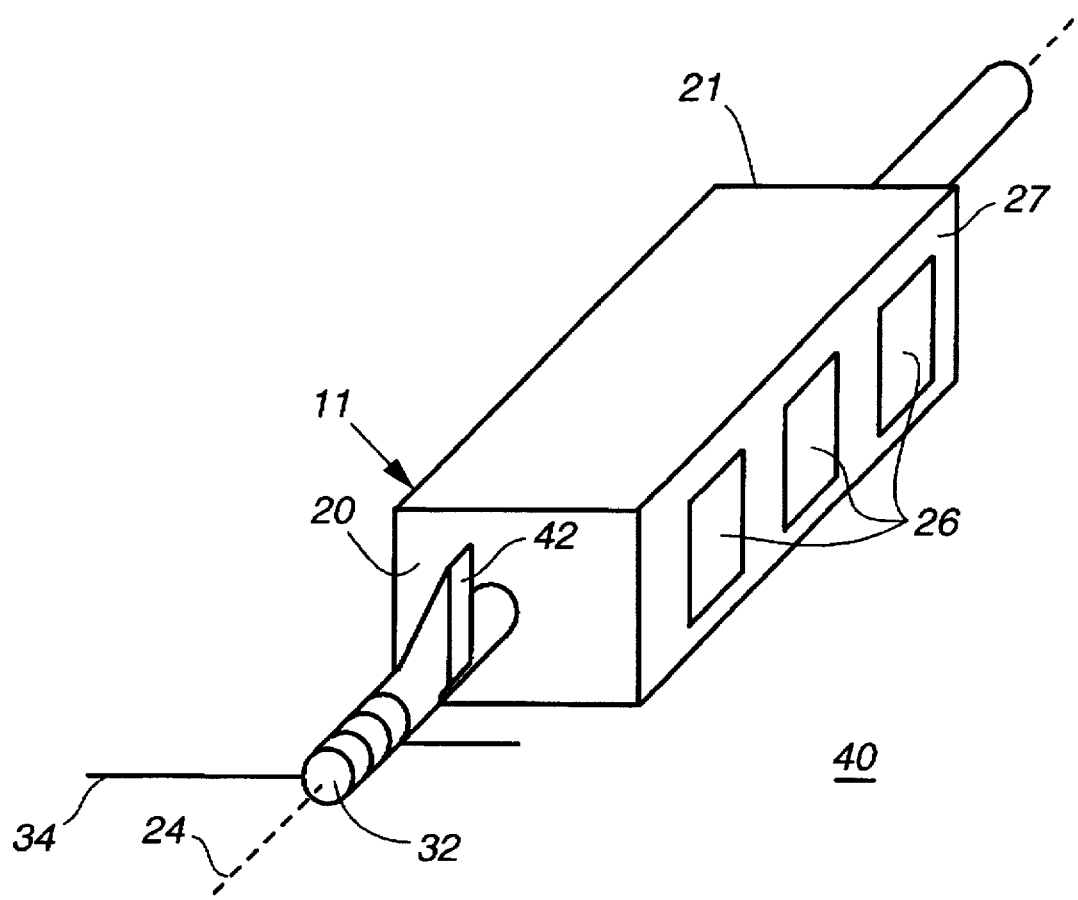
FIG. 3 is a perspective view of a third alternate embodiment of a contact carrier in accordance with the invention.

Referring now to FIG. 3, there is illustrated therein a perspective view of a third alternate embodiment of a contact carrier 40 in accordance with the invention. Features of contact carrier 10 shown in FIG. 1 and contact carrier 30 shown in FIG. 2 are similarly shown here with the following differences. The protrusion 18 shown in FIG. 1 is eliminated, and a protrusion 42 extending upwards from rod shaped protrusion 32 replaces it. Protrusion 42, like protrusion 18, is engaged by corresponding structure on the second electrical device when the second electrical device is connected to the first electrical device. The corresponding structure, shown in FIGS. 5–7, imparts rotation to the contact carrier 40, bringing electrical contacts 26 into engagement with corresponding electrical contacts or the second electrical device.

Figure 4:
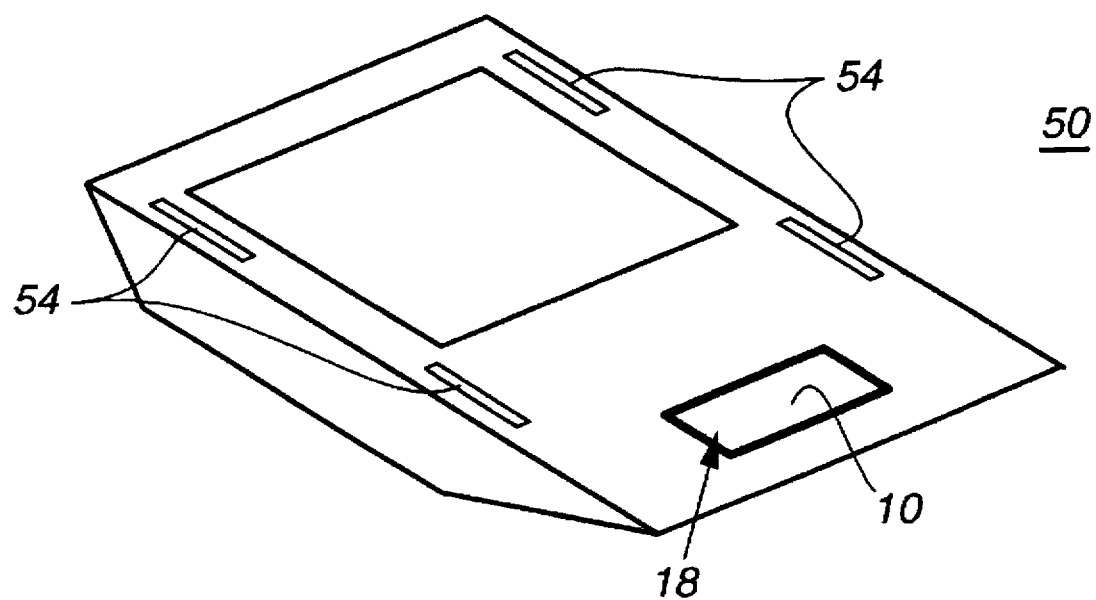
FIG. 4 is a perspective view of an electrical device having a contact carrier in accordance with the invention.

To illustrate how the invention is practiced, an electrical device is shown in FIG. 4 as a battery pack 50. Alternatively the battery pack 50 could be some other energy source such as a battery eliminator. A rotatable contact carrier 10 as shown in FIGS. 1–3 is shown on the face 52 of the battery pack 50. The protrusion 18 is in a position where it will be engaged when a second electrical device, which could be a portable communications device such as a cellular phone, is connected to the battery via slide rails 54. FIGS. 5–7 illustrate the sequence of contact engagement when the first and second electrical devices are connected. FIGS. 5–7 show a cross section of the interface 60 between a first electrical device 62 having a rotatable contact carrier 10 as shown in FIG 1. The contact carrier 10 is electrically connected to a flexible circuit board 28 which electrically interconnects the first electrical device 62 with the electrical contacts (not shown) disposed on a third side 27 of the carrier body 11, and are concealed as shown in FIG. 4. The second electrical device 64 has an electrical contact 66 which electrically interconnects with the second electrical device 64. An engagement feature such as notch 68 is provided on the second electrical device such that when the two devices are first placed together, as in FIG. 5, the protrusion 18 is not contacted by any portion of the second electrical device 64. As the second electrical device 64 is slid into engagement with the first electrical device 62, as in FIG. 6, the engagement feature 68 contacts protrusion 18 imparting rotation to the contact carrier about it's pivotal mounting, for example, the rods shown in FIG. 2. Finally, as shown in FIG. 7, the electrical contact 66 of the second electrical device 64 is slid into electrical contact with the now exposed contact(s) on the contact body 11 which is fully rotated, so that side 27 is turned 90° from its original position shown in FIG. 5. It may be appreciated that when the second electrical device 64 is removed from the first device 62, the biasing devices, such as springs 34 in FIG. 2 assume that contact carrier 10 returns to the position illustrated in FIG. 5.

Since the contacts on the contact carrier are concealed until the two devices are connected, the risk of damage from ESD is reduced. Likewise, the potential for the contacts to corrode is reduced. In the case of energy source such as battery packs, the safety of the energy source is greatly increased. The invention eliminates the potential of a foreign object to short circuit the contacts since the contact are only revealed to a device having the appropriate engagement structure.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rotatable contact carrier for a first electrical device, said contact carrier comprising:

a carrier body having a top, bottom, and four sides, and defining an axis, said carrier body further including a protrusion extending from at least a portion of said top of said carrier body;

at least one electrical contact for electrically interconnecting said first electrical device with a second electrical device, said at least one electrical contact disposed on one side of said carrier body;

pivotal mounting means disposed on opposing sides of said carrier body along said axis; and connection means for electrically interconnecting said at least one electrical contact with said first electrical device, wherein said connection means comprises a flexible circuit board electrically connected to said rotatable contact carrier.

2. A rotatable contact carrier as defined in claim 1, further comprising a spring means for biasing said contact carrier so that said at least one electrical contact is concealed when said first electrical device is not coupled to said second electrical device.

3. A rotatable contact carrier as defined in claim 1, wherein said first electrical device is a battery pack.

4. A rotatable contact carrier as defined in claim 1, wherein said pivotal mounting means comprises a first pivot protrusion extending along said axis of said carrier body from at least a portion of one of said opposing sides of said carrier body, and a second pivot protrusion extending from at least a portion of the corresponding opposing side along said axis of said carrier body.

5. A rotatable contact carrier as defined in claim 1, wherein said pivotal mounting means comprises a first pivot depression extending along said axis of said carrier body into at least a portion of one of said opposing sides of said carrier body, and a second pivot depression extending into at least a portion of the corresponding opposing side along said axis of said carrier body.

6. A rotatable contact carrier as defined in claim 1, wherein said pivotal mounting means comprises a pivot depression extending along said axis of said carrier body into at least a portion of one of said opposing sides of said carrier body, and a pivot protrusion extending from at least a portion of the corresponding opposing side along said axis of said carrier body.

7. A rotatable contact carrier for a first electrical device, said contact carrier comprising:

A carrier body having a top, bottom, and four sides, and defining an axis, and further including a protrusion extending from at least a portion of said top of said carrier body;

at least one electrical contact for electrically interconnecting said first electrical device with a second electrical device, said at least one electrical contact disposed on a first side of said carrier body;

pivotal mounting means disposed on opposing sides of said carrier body;

spring means for biasing said contact carrier so that said at least one electrical contact is concealed when said first electrical device is not coupled to said second electrical device; and a flexible circuit board electrically connected to said contact carrier for electrically interconnecting said at least one electrical contact with said first electrical device.

8. A rotatable contact carrier as defined in claim 7, wherein said first electrical device is a battery pack.

9. A rotatable contact carrier as defined in claim 7, wherein said pivotal mounting means comprises a first pivot protrusion extending along said axis of said carrier body from at least a portion of one of said opposing sides of said carrier body, and a second pivot protrusion extending from at least a portion of the corresponding opposing side along said axis of said carrier body.

10. A rotatable contact carrier as defined in claim 7, wherein said pivotal mounting means comprises a first pivot depression extending along said axis of said carrier body into at least a portion of one of said opposing sides of said carrier body, and a second pivot depression extending into at least a portion of the corresponding opposing side along said axis of said carrier body.

11. A rotatable contact carrier as defined in claim 7, wherein said pivotal mounting means comprises a pivot depression extending along said axis of said carrier body into at least a portion of one of said opposing sides of said carrier body, and a pivot protrusion extending from at least a portion of the corresponding opposing side along said axis of said carrier body.

12. A rotatable contact carrier for an energy source, said contact carrier comprising:

a carrier body having a top, bottom, and four sides, and defining an axis, and further including a protrusion extending from at least a portion of said top of said carrier body;

at least one electrical contact for electrically interconnecting said energy source with an electrical device, said at least one electrical contact disposed on a first side of said carrier body;

a rod shaped protrusion extending from at least a portion of one of said opposing sides of said carrier body along said axis of said carrier body;

a spring mounted on said rod shaped protrusion for biasing said carrier body so that said at least one electrical contact is concealed when said energy source is not coupled to said electrical device; and a flexible circuit board electrically connected to said carrier body for electrically interconnecting said at least one electrical contact with said first electrical device.

13. A rotatable contact carrier as defined in claim 12, wherein said energy source is a battery pack.

14. A rotatable contact carrier as defined in claim 12, wherein said electrical device is a portable communications device.

15. A rotatable contact carrier for an energy source, said contact carrier comprising:

a carrier body having a top, bottom, and four sides;

at least one electrical contact for electrically interconnecting said energy source with an electrical device, said at least one electrical contact disposed on a first side of said carrier body;

a rod shaped protrusion extending from at least a portion of one of said sides of said carrier body along an axis, and further including a protrusion extending upwards from said rod shaped protrusion;

a spring mounted on said rod shaped protrusion for biasing said carrier body so that said at least one electrical contact is concealed when said energy source is not coupled to said electrical device; and a flexible circuit board electrically connected to said contact carrier for electrically interconnecting said at least one electrical contact with said first electrical device.

16. A rotatable contact carrier as defined in claim 15, wherein said energy source is a battery pack.

17. A rotatable contact carrier as defined in claim 15, wherein said electrical device is a portable communications device.

* * * * *